United States Patent Office 3,644,337
Patented Feb. 22, 1972

3,644,337
PROCESS FOR THE MANUFACTURE OF
3-FORMYLRIFAMYCIN-SV
Hans Bickel and Bruno Fechtig, Binningen, and Wilhelm Kump, Therwil, Switzerland, assignors to Ciba Corporation, New York, N.Y.
No Drawing. Filed June 4, 1968, Ser. No. 734,199
Claims priority, application Switzerland, June 16, 1967, 8,583/67
Int. Cl. C07d 87/54
U.S. Cl. 260—239.3    22 Claims

ABSTRACT OF THE DISCLOSURE

A new process for preparing 3-formylrifamycin-SV from 3-aminomethyl-rifamycin S compounds without the use of an oxidant is based on a finding that 3-aminomethyl-rifamycin-S compounds whose amino group in position 3 is derived from a secondary amine is split by acids in the presence of water to give 3-formylrifamycin-SV and the amine corresponding to the amino group in position 3 of the starting material used. The said 3-aminomethylrifamycin S compounds probably react in the presence of acid in a tautomeric form which by addition of acid gives amine derivatives of 3-formyl-rifamycin-SV; the latter split hydrolytically into 3-formylrifamycin SV and an amine.

BACKGROUND OF THE INVENTION

As is known, 3-formylrifamycin has very good antibacterial properties and is also a very important intermediate for the manufacture of numerous derivatives of high antibiotic activity, especially of its functional aldehyde derivatives, for example of the hydrazones. 3-formylrifamycin SV, which corresponds to the following partial structural formula

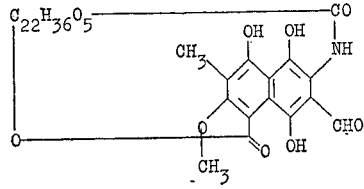

is accessible by the hitherto known process by oxidizing 3-aminomethylrifamycin-SV derivatives of the partial structural formula

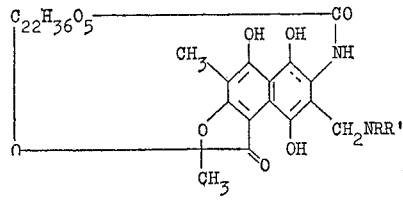

where R and R' represent hydrogen, alkyl, aralkyl, cycloalkyl or, together with the nitrogen atom, the residue of a heterocyclic compound containing one or more than one hetero atom—with a mild oxidizing agent in a suitable solvent. Suitable oxidants are more especially alkylnitrites, lead tetraacetate, persulfates, 1,4-quinones, oxygen in the presence of a catalyst, potassium ferricyanide or manganese dioxide (see British Pat. 1,109,631). The solvent used depends on the oxidant concerned, for example the oxidation with an alkylnitrite or with lead tetraacetate is preferably performed in a halogenated hydrocarbon such as chloroform or carbon tetrachloride, is desired or requied, with addition of an aliphatic carboxylic acid, such as acetic acid. The oxidation is carried out at room temperature and should take from 2 to 24 hours depending on the starting material used. Before isolating the oxidation product it is possible to carry out a treatment with ascorbic acid.

It appears that in this process, apart from the desired formation of 3-formylrifamycin-SV, also further reactions occur which give rise to undesired by-products so that the yields of 3-formylrifamycin-SV are always very moderate and never exceed 50% of the theoretical.

The advantage of the new process of the present invention as compared with the said known method is that the formation of 3-formylrifamycin-SV takes place in the absence of an oxidant which could convert 3-formylrifamycin-SV into products of a higher stage of oxidation.

SUMMARY OF THE INVENTION

The present invention provides a new process for the manufacture of 3-formylrifamycin-SV wherein a 3-aminomethylrifamycin-S derived from a secondary amine, if desired, in admixture with the corresponding 3-aminoethyl-rifamycin-SV, is treated in the absence of an oxidant with an acid and a resulting 3-aldehyde derivative of 3-formylrifamycin-SV is hydrolysed.

A new process for the preparation of the starting compounds of the above formula also pertains to the invention: it consists in oxidizing a 3-aminomethylrifamycin-SV compound corresponding to the desired product to be used as starting material for the above process with excess potassium ferricyanide solution in a water miscible tertiary weakly basic amine at a temperature of at most 0° and extracting the oxidized compound with a water immiscible organic solvent.

DESCRIPTION OF THE PREFERRED EMBODIMENTS

The method of the process of the present invention for the manufacture of 3-formyl rifamycin SV is based on the finding that 3-aminomethylrifamycin-S compounds (I), whose amino group in position 3 is derived from a secondary amine, is split by acids in the presence of water into 3-formylrifamycin-SV and the amines corresponding to the amino group in position 3 of the starting material used. It is assumed that the starting materials react in the presence of acid in the tautomeric form (II), and the amine derivatives of 3-formylrifamycin-SV (III) intermediately formed by the additive acid reaction break up hydrolytically into 3-formylrifamycin-SV (IV) and amine:

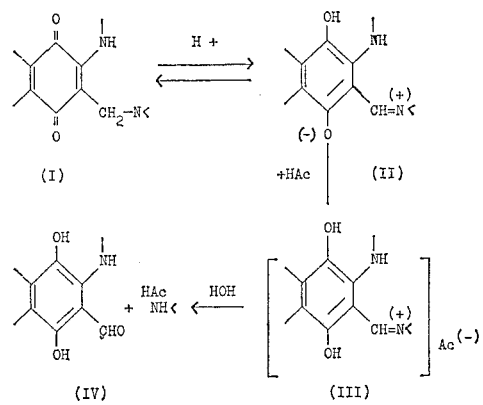

An advantage of this method over the known method described above is that the formation of 3-formylrifamycin-SV takes place in the absence of an oxidant which could convert 3-formylrifamycin-SV into products of a higher stage of oxidation. Even in the new method of the present invention a minor oxidation of 3-formylrifamycin-SV does take place by the oxidizing effect of the quinone (I) used as starting material—whereby, probably, apart from the hydroquinone derivative corresponding to the starting material, 3-formylrifamycin-S and other compounds resulting from it that can no longer be reduced to 3-formylrifamycin-SV are formed—but this side reaction is easy to suppress by reducing the redox potential of the starting material by the addition of the corresponding 3-aminomethylrifamycin-SV or by formation of this compound by addition of the calculated quantity of a suitable reducing agent capable of reducing a quinone to hydroquinone. In this manner the side reactions can be substantially excluded and the yield increased. The 3-aminomethylrifamycin-SV derivative, which has been added or formed, is regenerated after completion of the reaction and can be used again as such or in the form of 3-aminomethylrifamycin-S.

Accordingly, the process of the present invention for the manufacture of 3-formylrifamycin-SV is characterized in that a 3-aminomethylrifamycin-SV compound of the formula

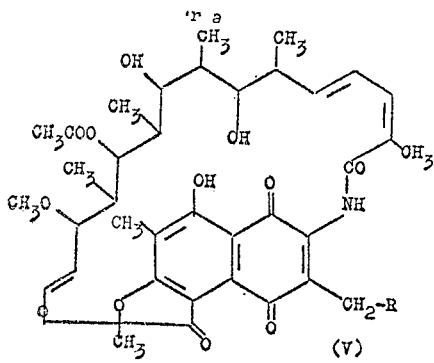

where R stands for an amino group derived from a secondary amine—if desired in admixture with the corresponding 3-aminomethylrifamycin-SV, is treated in the absence of an oxidant with an acid and a resulting 3-aldehyde derivative of 3-formylrifamycin-SV is hydrolyzed.

In the above Formula (V) R stands for an amino group derived from a secondary amine. The substituting residue(s) of this amino group may be of aliphatic, aromatic, cycloaliphatic, araliphatic or heterocyclic character, being above all lower aliphatic, cycloaliphatic, araliphatic or aromatic hydrocarbon residues in which the aliphatic or cycloaliphatic residues may be interrupted by hetero atoms such as oxygen, sulphur or nitrogen, and aliphatic residues may be substituted by free hydroxyl, amino or mercapto groups or by halogen atoms, such as fluorine, chlorine, bromine or iodine, and aromatic groups by lower alkyl, alkoxy or alkenyloxy groups, for example those mentioned below, or by halogen atoms, such as fluorine, chlorine, bromine or iodine or the pseudohalogen trifluoromethyl. Suitable lower hydrocarbon residues are above all lower alkyl or alkenyl radicals, such as methyl, ethyl, propyl, isopropyl; linear or branched butyl, pentyl, hexyl or heptyl residues linked in any desired position; allyl or methallyl residues; unsubstituted or alkyl-substitute cycloalkyl or cycloalkenyl residues such as cyclopentyl, cyclohexyl, cycloheptyl, cyclopentenyl or cyclohexenyl residues; unsubstituted or alkyl-substituted cycloalkylalkyl or -alkenylalkyl residues, such as cyclopentyl- or cyclohexenyl-methyl, -ethyl or -propyl residues; aralkyl or aralkenyl such as phenyl-methyl, -ethyl, -vinyl or -propyl residues, or aryl, especially phenyl residues; or alkylene or alkenylene residues, for example butylene-(1,4),pentylene-(1,5), 1,5 - dimethyl-pentylene-(1,5), hexylene-(1,6), hexylene-(1,5). Residues of this kind interrupted by hetero atoms are, for example, alkoxyalkyl or oxa-cycloalkylalkyl residues such as methoxyethyl, ethoxyethyl, propoxyethyl, butoxyethyl, methoxypropyl, methoxyethoxyethyl, tetrahydrofurylmethyl, methylmercaptoethyl, oxa-, aza- or thia-alkylene or -alkenylene residues such as 3-aza-, 3-oxa- or 3 - thia- -pentylene-(1,5), 3-aza-hexylene-(1,6), 1,5-dimethyl-3-aza- -pentylene-(1,5), 3-methyl-3-aza-pentylene-(1,5) or 3 - hydroxy-ethyl-3-aza-pentylene-(1,5). The amino group is above all a di-lowe ralkylamino group such as the dimethylamino, diethylamino, dipropylamino, N-methyl-N-ethylamino, an N-lower alkyl-N-cycloalkylamino group such as the N - methyl - N-cyclopentyl or -cyclohexyl group, an N-di-cycloalkylamino group, a possibly C-lower alkylated pyrrolidino, piperidino, morpholino thiamorpholino, piperazino or N-lower alkyl- or hydroxy-lower alkyl-piperazino group such as the pyrrolidino, piperidino, morpholino, piperazino, N-methyl-N-ethyl- or N-β-hydroxqethyl- -piperazino group.

The acids to be used in the present process are preferably inorganic or organic acids, such as hydrochloric, sulphuric or phosphoric acid, aliphatic carboxylic acids, for example acetic or propionic acid or their halogenated derivatives such as chloroacetic acid, or organic sulphonic acids such as para-toluenesulphonic acid or methanesulphonic acid. It is also possible to use Lewis' acids such as boron trifluoride, aluminium chloride, zinc chloride or the like.

The acid treatment according to this invention is carried out in an anhydrous or aqueous solvent. When acids of the "Bronstedt" type are used, aqueous solvents are preferred, whereas anhydrous solvents are preferably used in the case of a Lewis' acid. Above all, aliphatic or aromatic hydrocarbons or their halogenated derivatives, or mixtures thereof, are used. Particularly suitable are among others benzene, toluene, chloroform, chlorobenzene, carbon tetrachloride, methylenechloride, ethylenechloride and mixtures thereof.

In the presence of water the isomerization of the starting material and the additive acid reaction are accompanied by the hydrolysis of the intermediates (III) so that the direct reaction product obtained is 3-formylrifamycin-SV which can be isolated from the reaction mixture is known manner. When the acid-catalyzed transformation of (I) into (II) is carried out in an anhydrous solvent, the reaction product is hydrolyzed subsequently, for example by adding a small quantity of water.

As described above, a mixture of 3-aminomethylrifamycin-S compound and 3-aminomethylrifamycin-SV compound may be used as starting material, using, for example, equimolecular proportions of the two compounds at which ratio the redox potential of the 3-aminomethylrifamycin-S compound has already been reduced so much that the above-mentioned undesired oxidation reactions practically do not occur any more. The 3-aminomethylrifamycin-SV derivative present at the end of the reaction of this variant can be separated from the 3-formylrifamycin-SV, for example by extraction or simple chromatography; if desired, it can be oxidized to the corresponding quinone, for example as described below, and then used as starting material in the present process. As a rule, more than the initially used quantity of 3-aminomethylrifamycin-SV derivative is regenerated, because small quantities of this product are always formed during the reaction from the 3-aminomethyl-rifamycin-S derivative used.

The 3-aminomethylrifamycin-S compounds of the above Formula V to be used as starting materials are accessible in known manner from the known, corresponding hydroquinone compounds (cf. for example British Pat. No. 1,090,115 of Journ. Med. Chem. 8, page 790 [1965]) by mild oxidation, for example with air or oxygen, with persulphates, potassium ferricyanide or alkylnitrites.

According to a particularly advantageous method of manufacturing the starting materials of the above Formula V, the corresponding 3-aminomethylrifamycin-SV compounds are treated in a water-miscible tertiary, weakly basic amine, for example pyridine, at a temperature of at most 0° C., with excess potassium ferricyanide solution, then extracted at the same temperature with a water-immiscible solvent, the organic phase is separated, dried and at a low temperature freed from the solvent. In this manner the quinones, which in the past were isolated pure only in the form of mangano salts, are obtained quantitatively in pure form. The quinone is extracted from the oxidation mixture preferably with a chlorinated aliphatic hydrocarbon such as chloroform, methylenechloride or carbon tetrachloride.

Alternatively, the quinones of the above Formula V are accessible by reacting rifamycin-S with at least 2 mol equivalents of formaldehyde and an excess of the amine corresponding to the amino group to be introduced. This "Mannich" reaction is performed, for example, by heating the said mixture in an inert organic solvent. After the condensation the solution is cooled, neutralized with acid and the 3-amino-methylrifamycin-S derivative is extracted with an organic solvent, for example with one of the above-mentioned chlorinated hydrocarbons. To isolate the desired quinone, the organic solution obtained in this manner can be dried and evaporated at a low temperature, as described above, or it can be used directly for the performance of the above process for the manufacture of 3-formylrifamycin-SV according to this invention. Thus, it is possible to start from rifamycin-S and obtain, without use of an oxidant, 3-formylrifamycin-SV and to transform the present process into a one-pot process for the manufacture of 3-formylrifamycin-SV starting from rifamycin-S.

The present invention includes also any variant of the present process in which an intermediate obtained at any one of its stages is used as starting material and any remaining steps are carried out, or in which a starting material is formed in situ.

The following examples illustrate the invention.

EXAMPLE 1

A solution of 1 g. of 3-piperidinomethyl-rifamycin-SV [prepared according to N. Maggi, V. Arioli and P. Sensi, Journ. Med. Chem. 8, page 6 (1965)] in 16 ml. of a 3:1-mixure of pyridine and water is stirred at 0° C. into a solution of 1 g. of potassium ferricyanide in 16 ml. of pyridine+water (1:3). After a minute the batch is diluted with 50 ml. of ice water and extracted once with 50 ml. of ice water and extracted once with 50 ml. and 3× with 25 ml. of chloroform. The combined chloroformic extracts are washed with 1× 25 ml. of water and 2× 25 ml. of 20% aqueous phosphoric acid solution and dried over soduim sulphate. After filtration, the resulting chloroform solution of 3-piperidinomethyl-rifamycin-S is mixed with 2 ml. of glacial acetic acid and 1 g. of 3-piperidinomethyl-rifamycin-SV and the whole is evaporated to dryness under vacuum. The residue is taken up in 50 ml. of a mixture of toluene+carbon tetrachlororide+glacial acetic acid (95:95:10) containing 1% of water, and the solution is kept for 17 hours at 24° C. The reaction mixture is evaporated, the residue dissolved in a small quantity of chloroform and filtered through a column of 12.5 g. of silicagel, rinsed with about 55 ml. of chloroform, and the claret-coloured solution of the product is collected until the colour of the filtrate changes to orange-brown. The column is then eluted with about 50 ml. of chloroform+acetone (1:1). The chloroform filtrate is evaporated, to yield 570 mg. of 3-formylrifamycin-SV which displays in the thin-layer chromatogram on silicagel in the system chloroform+acetone (6:4) only one spot ($R_f=0.51$) and in the ultraviolet spectrum (0.01 N-hydrochloric acid in dioxane) reveals the following maxima: $\lambda_{max.}$ 327 m$\mu$ ($\epsilon_1$=17,000) and $\lambda_{max.}$ 494 m$\mu$ ($\epsilon_2$=8,500). Compared with a crystalline material ($\epsilon_1$=19,800, $\epsilon_2$=10,200), the product has a calculated purity of 84%. On evaporation of the chloroform+acetone eluate 1.369 g. of 3-piperidinomethyl-rifamycin-SV is recovered, which is unitary according to its thin-layer chromatogram, and is taken into consideration in computing the yield: Yield: 82% of theory.

EXAMPLE 2

1 gram of 3-piperidinomethyl-rifamycin-SV is oxidized as described in Example 1 to form 3-piperidinomethyl-rifamycin-S and, as there described, hydrolyzed (but without addition of 3-piperidinomethyl-rifamycin-SV) and worked up with the mixture of toluene+carbon tetrachloride+glacial acetic acid+water, to yield 394 mg. of 3-piperidinomethyl-rifamycin-SV and 398 mg. of 3-formyl-rifamycin-SV of about 72% purity, in a yield of 51% of theory.

EXAMPLE 3

A solution of 1 g. of 3-diethylaminomethyl-rifamycin-SV in 50 ml. of chloroform, together with 50 ml. of a 10% solution of potassium ferricyanide, is poured into molar, aqueous potassium secondary phosphate buffer and vigorously stirred for 15 minutes at 22° C. The two phases are separated and the aqueous phase is extracted with 2× 25 ml. of chloroform. The combined extracts are dried over sodium sulphate, mixed with 1 ml. of glacial acetic acid and 1 g. of 3-diethylaminomethyl-rifamycin-SV, and evaporated under vacuum. The residue is hydrolyzed and worked up as described in Example 1, to yield unitary 3-formylrifamycin-SV.

EXAMPLE 4

A mixture of 21.8 g. of rifamycin-S, 8.5 ml. of 40% formalin and 5.4 g. of piperidine in 150 ml. of tetrahydrofuran is heated for 48 hours at 30° C., then poured into ½ litre of 0.5 molar aqueous potassium primary phosphate solution and the solution is adjusted to pH=3.5 with concentrated phosphoric acid. The whole is extracted with 3× ½ litre of ethyl acetate and the extracts are combined, dried and evaporated under vacuum, to yield 22.3 g. of crude 3-piperidinomethyl-rifamycin-S.

We claim:

1. Process for the manufacture of 3-formyl-rifamycin-SV, wherein a member selected from the group consisting of a 3-aminomethyl-rifamycin S compound of the formula

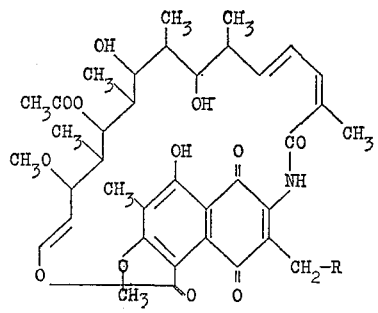

in which R represents an amino group derived from a secondary amine, and a mixture of such compound with the corresponding 3-aminomethyl-rifamycin SV is treated with an acid in the absence of an oxidant and any resulting 3-aldehyde derivative of 3-formyl-rifamycin-SV is hydrolyzed.

2. Process as claimed in claim 1, wherein an inorganic acid is used.

3. Process as claimed in claim 1, wherein an organic acid is used.

4. Process as claimed in claim 1, wherein an aliphatic carboxylic acid is used.

5. Process as claimed in claim 1, wherein acetic acid is used.

6. Process as claimed in claim 1, wherein an organic sulfonic acid is used.

7. Process as claimed in claim 1, wherein a Lewis acid is used.

8. Process as claimed in claim 1, wherein the treatment with an acid is performed in an anhydrous solvent.

9. Process as claimed in claim 1, wherein the treatment with an acid is performed in an aqueous solvent.

10. Process as claimed in claim 1, wherein the treatment with an acid is performed in a member selected from the group consisting of a hydrocarbon and a halogenated derivative thereof.

11. Process as claimed in claim 1, wherein the treatment with an acid is performed in a mixture of toluene and carbon tetrachloride.

12. Process as claimed in claim 1, wherein the treatment with an acid is performed with glacial acetic acid in a mixture of toluene and carbon tetrachloride in the presence of water.

13. Process as claimed in claim 1, wherein any 3-aldehyde derivative of 3-formyl-rifamycin SV obtained by treatment of the starting material with an acid in any anhydrous solvent is hydrolysed with water.

14. Process as claimed in claim 1, wherein there is used a starting compound of the Formula V given in claim 1, in which formula R represents a di-lower alkylamino group.

15. Process as claimed in claim 1, wherein there is used a starting compound of the Formula V given in claim 1, in which formula R represents a diethylamino group.

16. Process as claimed in claim 1, wherein there is used a starting compound of the Formula V given in claim 1, in which formula R represents an alkyleneamino group.

17. Process as claimed in claim 1, wherein there is used a starting compound of the Formula V given in claim 1, in which formula R represents a member selected from the group consisting of pyrrolidino, piperidino, piperazino and morpholino.

18. Process for the manufacture of compounds of the formula (V)

in which R represents an amino group derived from a secondary amine wherein a corresponding 3-aminomethyl-rifamycin-SV compound is treated at a temperature of at most 0° C. in a water-miscible, tertiary, weakly basic amine with an excess of potassium ferricyanide solution, the solution is extracted at the same temperature with a solvent which is immiscible with water and the organic phase is separated, dried and freed from solvent at a low temperature.

19. Process as claimed in claim 18, wherein pyridine is used as the weakly basic amine.

20. Process as claimed in claim 18, wherein the solution is extracted with a chlorinated aliphatic hydrocarbon.

21. Process as claimed in claim 18, wherein the solution is extracted with chloroform.

22. Process as claimed in claim 18, wherein there is used as starting compound a hydroquinone corresponding to the compound of Formula V, in which formula R represents a di-lower alkylamino group.

References Cited

UNITED STATES PATENTS 3,338,888   8/1967   Bickel et al. -------- 260—239.3
3,342,810   9/1967   Maggi et al. -------- 260—239.3

FOREIGN PATENTS 1,090,115   11/1967   Great Britain ------ 260—239.3

OTHER REFERENCES

Bickel et al. "Antimicrobial Agents and Chemotherapy" pp. 352–358. Effective date Oct. 26–28 (1966).

HENRY R. JILES, Primary Examiner
R. T. BOND, Assistant Examiner

U.S. Cl. X.R.
424—244, 285